May 30, 1961 R. H. ANDERSON 2,986,411
PLASTISOL PIPE JOINT
Filed Oct. 31, 1957 5 Sheets-Sheet 1

INVENTOR.
RICHARD H. ANDERSON
BY
Hyde, Meyer, Baldwin & Doran
ATTORNEYS

May 30, 1961

R. H. ANDERSON 2,986,411

PLASTISOL PIPE JOINT

Filed Oct. 31, 1957

INVENTOR.
RICHARD H. ANDERSON
BY
Hyde, Meyer, Baldwin & Doran
ATTORNEYS

May 30, 1961 R. H. ANDERSON 2,986,411
PLASTISOL PIPE JOINT
Filed Oct. 31, 1957 5 Sheets-Sheet 3

INVENTOR.
RICHARD H. ANDERSON
BY
Hyde, Meyer, Baldwin & Doran
ATTORNEYS

May 30, 1961 R. H. ANDERSON 2,986,411
PLASTISOL PIPE JOINT
Filed Oct. 31, 1957 5 Sheets-Sheet 4

INVENTOR.
RICHARD H. ANDERSON
BY
Hyde, Meyer, Baldwin & Doran
ATTORNEYS

United States Patent Office 2,986,411
Patented May 30, 1961

2,986,411
PLASTISOL PIPE JOINT

Richard H. Anderson, Dover, Ohio, assignor to The Robinson Clay Products Company, Akron, Ohio, a corporation of Maine Filed Oct. 31, 1957, Ser. No. 693,738

3 Claims. (Cl. 285—291)

This invention relates to improvements in a pipe joint and more particularly to one in which low dimensional-tolerance joint forming material is substantially integrally jointed or bonded to a high dimensional-tolerance material forming the main body of the pipe.

One of the objects of the present invention is to provide a root proof and leak proof pipe joint for connecting pipes made generally of clay, cement, asbestos cement, cast iron, stoneware, chemical porcelainware, drain tile and vitrified tile and similar materials which cannot be held to close dimensions in manufacturing and which I have called high dimensional-tolerance materials forming the main body of the pipe. The invention contemplates the forming of a pipe joint where sections of the high dimensional-tolerance pipe material are joined and these joints may be formed of synthetic resins and resinous compositions, and elastomeric materials which can be held to close dimensions in manufacture and which I have called low dimensional-tolerance joint forming materials.

It has long been desirable to join short lengths of low cost pipe in such a manner that the completed line should be root proof and leak proof and, in many instances, able to stand more or less pressure. One of the difficulties in obtaining this goal has been that these cheaper pipe materials when made commercially in large quantities could not be held to very exact dimensions and therefore the joints where the sections of pipe were jointed together could not be quickly and efficiently sealed in a dependable manner using the customary field methods. The present invention provides various structures wherein an exact or close dimension joint forming material is bonded substantially integrally to the main body of the cheaper pipe material so as to form a joint which can be held in commercial production to close enough tolerance so as to provide the advantages which have long been desired.

Other objects and advantages of the present invention will be apparent from the accompanying drawings and description and the essential features will be set forth in the appended claims.

In the drawings:

Fig. 15 is a fragmental transverse sectional view taken diametrically of a pipe showing another modification of my invention;

Fig. 16 is a fragmental transverse sectional view taken diametrically of a pipe showing another modification of my invention;

Fig. 17 is an end elevation of a pipe embodying any one of four other modifications of my invention as disclosed in fragmental sectional views in Figs. 18, 19, 20 and 21;

Fig. 20 is a fragmental transverse sectional view, enlarged, taken along the line A—A of Fig. 17 showing another modification of my invention; while Fig. 21 is a fragmental transverse sectional view, enlarged, taken along the line A—A of Fig. 17 showing another modification of my invention.

In the form of my invention shown in Figs. 1 to 6 inclusive, I show a form of my invention where a threaded joint is utilized to connect lengths of pipe 15 which may be of any of the types above described but which, to avoid circumlocution, I will refer to as clay pipe. It has long been recognized that if cheap pipe of this sort could be connected in a satisfactory and inexpensive manner by means of threaded joints certain fields would be open for use which have heretofore been closed because of the inability to form a proper and tight joint. Where the pipe is to be utilized for my invention, I prefer to roughen the outer surface of the pipe near the ends as indicated at 16 when the pipe is formed. A simple way to do this is to provide a series of scratches in the surface of the pipe material extending circumferentially of the pipe. These scratches may be made in any way but if they are undercut then the material to be added will be bonded to the pipe in a better fashion.

Figures 1, 2, 3, 4:
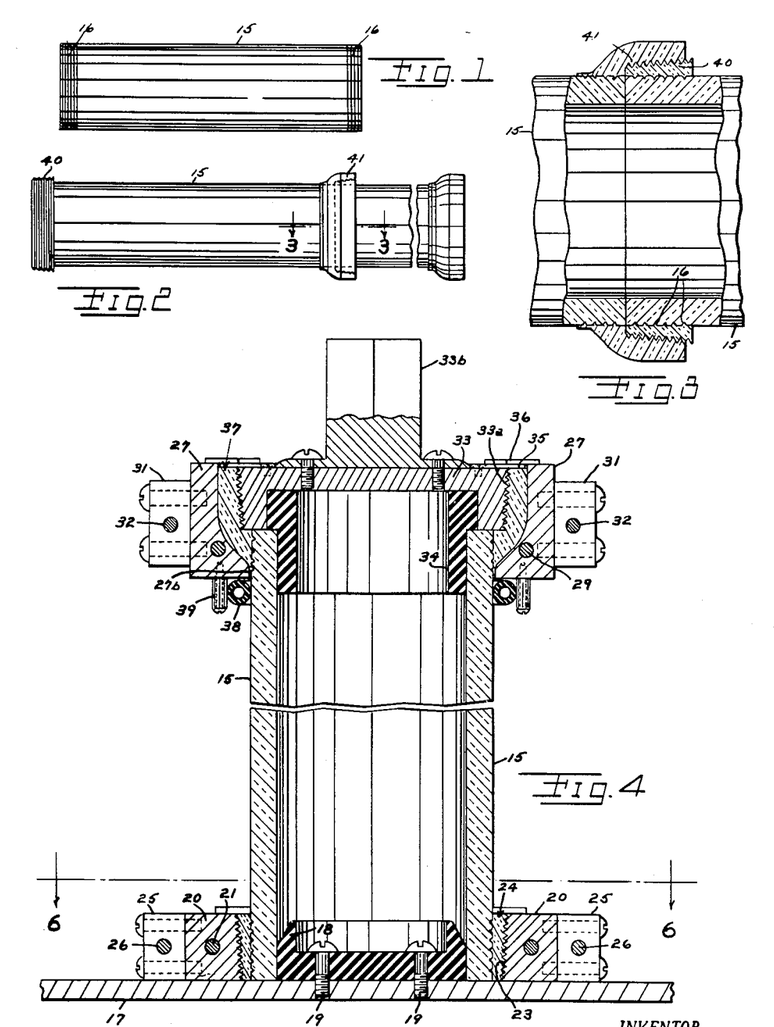
Fig. 1 is an elevational view of a section of clay pipe having its outer surfaces roughened by scratches near the ends running circumferentially so as to pre-condition the pipe for formation of my improved joint.
Fig. 2 is a side-elevational view showing the pipe of Fig. 1 equipped with male and female threaded joint portions and showing how two such sections may be joined together.
Fig. 3 is a fragmental sectional view greatly enlarged taken along the line 3—3 of Fig. 2.
Fig. 4 is a central sectional view through a length of clay pipe showing apparatus adapted to form on the ends of the pipe the male and female threads shown in Figs. 2 and 3. This view is taken along the line 4—4 of Fig. 5.
Figure 6:
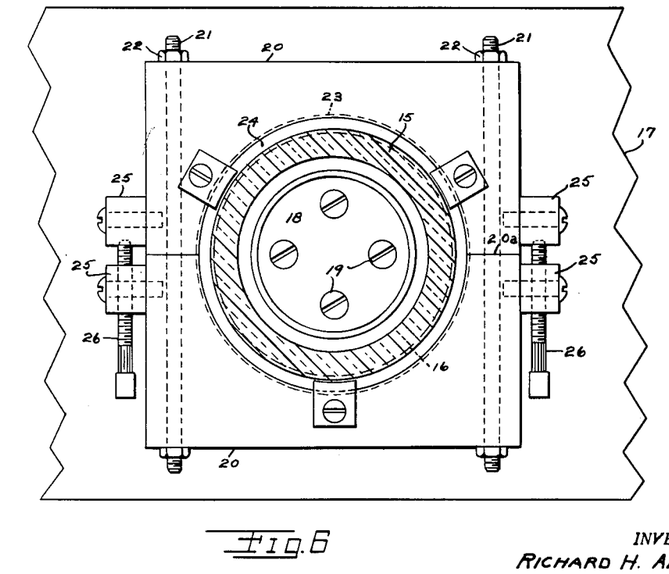
Fig. 6 is a transverse sectional view taken along the line 6—6 of Fig. 4.

The length of clay pipe 15 to be equipped with my improved joint is placed in a vertical position upon a base plate 17 and may be provided with a centering ring 18 of rubberlike material secured to the base plate as by means of the bolts 19. A male thread forming mold 20 completely surrounds the lower end of the pipe 15 and spaced therefrom leaving an annular space 21 which is later filled with the joint forming material as will be presently described. The mold 20 may be formed in two halves as shown in Fig. 6, held in assembled position by means of the bolts 21 and nuts 22. The thread 23 is formed on the interior upstanding face of the mold 20 as clearly shown in Fig. 4 and these threads are so formed in the two halves of the mold 20 as to provide a continuous and complete thread on the completed article. Preferably, but not necessarily, the threads are formed on a taper as shown in Fig. 4 for a purpose later described. In one form of my invention, I use a standard pipe thread having eight threads per inch and having a taper of one inch in sixteen inches. I have also successfully made a joint where the taper was one inch in eight inches. For aid in separating the two halves of the mold 20 along the parting line 20a at the close of a molding operation, projections 25 may be provided at each side of the mold and a screw 26 threaded in one of the projections and abutting against the other of a pair of projections is provided to separate the two halves of the mold.

Figure 5:
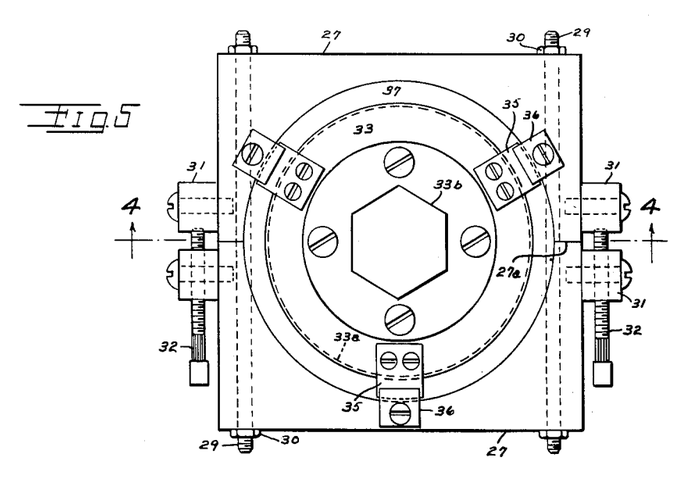
Fig. 5 is a top plan view of the apparatus of Fig. 4.

For forming the female thread at the upper end of the pipe 15, I provide two half mold sections 27 as clearly shown in Figs. 4 and 5 meeting at a parting line 27a and provided with an internal thread 28, the mold portions 27 coacting so that one continuous thread is provided. Bolts 29 and nuts 30 hold the two mold portions 27 together during a molding operation. Projections 31 and screws 32 provide means for separating the mold after a molding operation as previously described in connection with Fig. 6. A plug 33 is provided with external threads 33a so as to form the female thread on the pipe joint after the molding operation. An annular rubber gasket 34 fits inside the upper end of the pipe and against the plug 33 so as to seal the same against leaks during a molding operation. A non-circular neck 33b is attached to the plug 33 so that the plug may be rotated out of the molded section after the completion of a molding operation. Ears 35 secured to the plug 33 underlie ears 36 which are attached to the upper face of the mold portion 27 so as to suspend the mold portions from the plug in proper position relative to the upper end of the pipe 15. In the construction just described, the external diameter of plug 33 is less than the internal diameter of the mold 27 at its upper portion thereby leaving an open annular space 37 to receive the resinous or elastomeric material which is to be poured into the mold. It will be noted that the lower portion of mold 27 curves inwardly and terminates in a lowermost diameter 27b which is only slightly greater than the external diameter of the pipe 15. A suitable sealing gasket of hollow rubber hose or the like 38 is provided at this point to prevent the molding material escaping downwardly along the pipe during a molding operation. Pins 39 hold this sealing gasket in place.

Utilizing the apparatus as described in connection with Figs. 4, 5 and 6, the elastomeric or resinous compound is poured into the annular space 24 to form a male thread at one end of the pipe 15 and the material is also poured in the annular space 37 at the upper end of the pipe to form the female thread. After the molding material has been suitably cured so that it hardens, the mold portions 20 and 27 are removed and the pipe is in the finished form as shown in Figs. 2 and 3 with the male thread 40 at one end and the female thread 41 at the other end.

Special arrangements may be made to release the molded product from the mold and many such arrangements are common. Where the mold portions 20 and 27 are formed of brass, I have mentioned that the mold may be coated with graphite dispersed in mineral oil. In some cases, a mold release agent may be included in the resin, or mold release may be provided by the arrangement of the mold parts, such as the screws 32 for forcing the mold apart, or compressed air may be used in a known manner to release the molded material from the mold itself.

Figure 7:
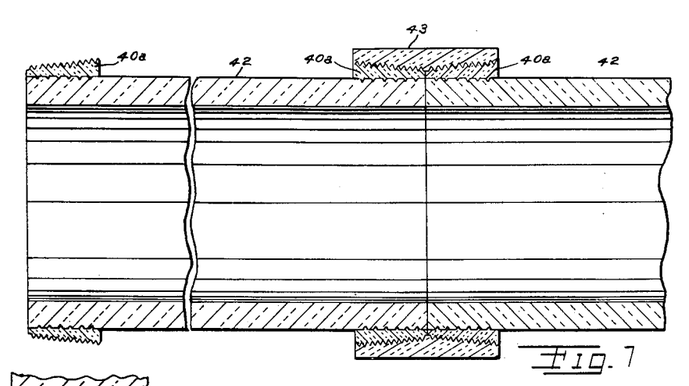
Fig. 7 is a central sectional view through two lengths of pipe equipped with a modified form of pipe joint wherein two abutting male threads are connected by a coupling.

In Fig. 7, I have shown another manner of carrying out my invention. In this instance, the male thread portions 40a in all respects like the male thread portion 40 previously described may be formed on both ends of the pipe sections 42. Then, when adjacent pipe ends are abutted together as shown in Fig. 7, a coupling or collar 43 may be utilized to join adjacent pipe sections. Those familiar with this art will understand that the coupling 43 is first threaded on to the end of one pipe, after which the male thread of the second pipe is threaded into the coupling. This is true where the tapered threads are used as shown in Fig. 7. Preferably, the coupling 43, if made of synthetic resin, would be compression molded.

Figures 7A, 8:
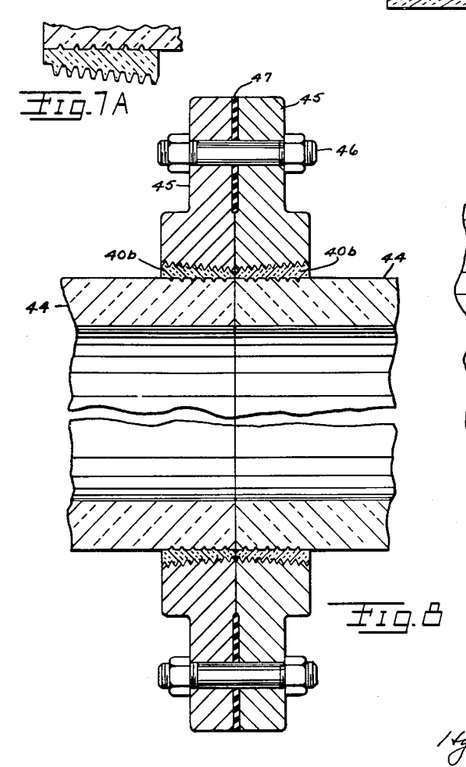
Fig. 7a is a fragmental sectional view similar to a portion of the lower left-hand side of Fig. 7 and showing a modified form of thread.
Fig. 8 is a central sectional view through two lengths of pipe showing a modified form of joint wherein two abutting male threads are equipped with flanges which in turn are bolted together to secure the joint.

Still another manner of using my invention is shown in Fig. 8 where male threads 40b are formed on the adjacent ends of the pipes 44 utilizing any of the methods previously described. Threaded onto each of the male threads 40b is a flange 45 which, if made of synthetic resin, would preferably be compression molded. When the pipe is assembled, adjacent flanges are secured together by bolts 46 in the standard manner of flange couplings with a gasket 47 of rubber-like material between the flanges to prevent leakage.

Figure 9:
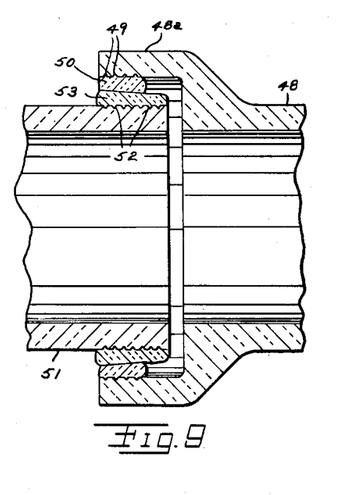
Fig. 9 is a central sectional view through another modified joint wherein a novel bell and spigot joint is formed using my teaching.

Still another form of my invention is shown in Fig. 9 as comprising a modified bell and spigot form of joint. Here the bell 48a of the pipe 48 is formed of the same material as the pipe, for instance, clay in some cases. The surface of the pipe is roughened as shown at 49 and a collar 50 is substantially integrally molded to the interior surface of the bell by the methods previously described. On the external surface of the pipe 51, I then mold an annular ring 53 according to the teachings of my invention.

When the parts of Fig. 9 are forced together, I prefer to provide about a four percent taper on the meeting surfaces of rings 50 and 53. I arrange the tolerance of the parts so that there is about a five percent compression of the more resilient ring 50 when the more rigid ring 53 is forced into the position of Fig. 9. I find if these parts are properly constructed, it is difficult to separate the joint of Fig. 9 while at the same time it permits considerable misalignment of the pipe while still forming a tight seal.

Figure 10:
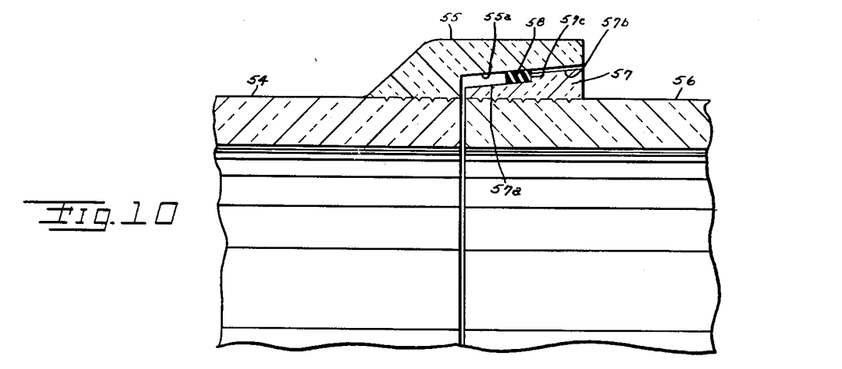
Fig. 10 is a fragmental central sectional view through two lengths of pipe showing another modification of a pipe joint constructed according to my teachings wherein bell and spigot ends are connected together with a gasket of rubberlike material sealing the joint.

In Fig. 10, I have shown still another modification adapted to utilize my invention. Here the pipe 54 is provided with a bell 55 which is cast in place after roughening the exterior surface of the end of pipe 54 as taught in my previous description. The end of pipe 56 is provided with a ring 57 case in place as taught in this invention. The meeting faces 55a, 57a, and 57b are preferably formed with about a five degree internal taper. When the joint is assembled, an annular gasket 58 of rubber-like material is forced into the bell 53 by means of the shoulder 57c. This effectively seals the joint. It has previously been attempted to form a joint of this sort but this joint was not successful because of inability to control the dimensions of the parts 55 and 57 when formed of the same material as the pipes 54 and 56. By utilizing my invention, I am able to hold better tolerances on the parts 55 and 57 so that this joint may be successfully used.

Figure 11:
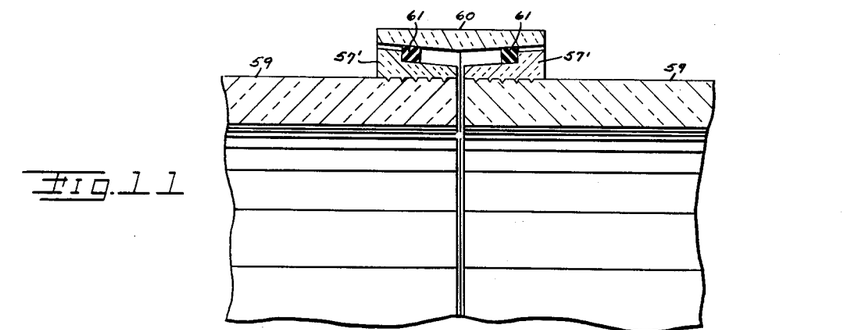
Fig. 11 is a fragmental central sectional view through still another modified form of joint wherein two of the spigot ends similar to that of Fig. 10 are connected together by a collar with rubberlike material forming gaskets sealing the joint.

In Fig. 11, I have shown still another modification of my invention. Here parts 57a have been cast on the ends of the pipes 59 according to the teachings of my invention after roughening the exterior surface of the pipes 59 where the casting is done. A coupling or collar 60 of any suitable rigid material, which if of synthetic resin would preferably be compression molded, is assembled together. First, one of the ends 57a is forced into the tapered portion of collar 60 with a gasket 61 of rubber-like material held against the shoulder of the members 57'. Then the other end 57' is forced into the collar pushing its rubber-like annular gasket 61 ahead of it by means of the shoulder on the member 57'. Preferably, I utilize about a five degree internal taper on the mating faces of parts 57' and collar 60.

Figure 12:
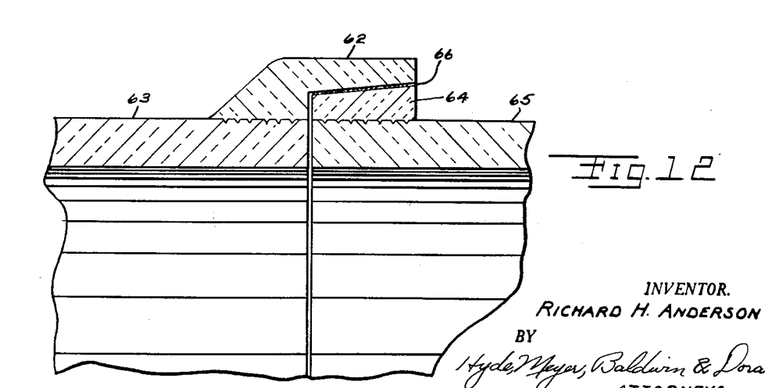
Fig. 12 is another form of bell and spigot joint forming still another modification and wherein the sealing action is arrived at in a slightly different manner.

Still another modification of my invention is shown in Fig. 12. Here the bell 62 is cast on one end of the pipe 63 while an external ring or spigot end 64 is cast on the mating pipe 65. The parts 62 and 64 are cast in place on the pipes after roughening the external surface of the pipe as taught in my previous description. The mating faces of the parts 62 and 64 are preferably formed with about a five degree taper. When the parts are assembled as in Fig. 12, there is an allowance of approximately three-thousandths of an inch between the parts to receive a suitable adhesive 66 which may be of synthetic resin, rubber or a suitable glue.

In the various forms of my invention where I have shown threaded connections, I have shown a simple pipe thread. In Fig. 7a, I have shown how such a thread may be truncated by cutting off about one-thirty-second inch of the sharp edge of the thread so as to form threads which are not so easily damaged.

Those familiar with the threaded art will also understand that I may utilize plural threads in order to save the number of turns necessary to connect a joint or I may use a fast acting Acme thread.

When assembling any of the threaded joints shown here, any common thread wiping compound may be utilized to seal the joint, or if the thread is formed using a plastisol with a little resilience and with a taper on the thread, then the joint is self-sealing when the thread is taken up.

One of the advantages of forming these threaded joints with a plastisol having a slight resiliency, is that, in case a joint is improperly lined up and the threads are inserted in a cocked manner, crowbar pressure exerted on a machinist strap wrench embracing the pipe, while turning up the joint, can cause the connection to jump a thread, so as to properly align the threads after which the joint may be screwed up tight.

Figures 13, 18:
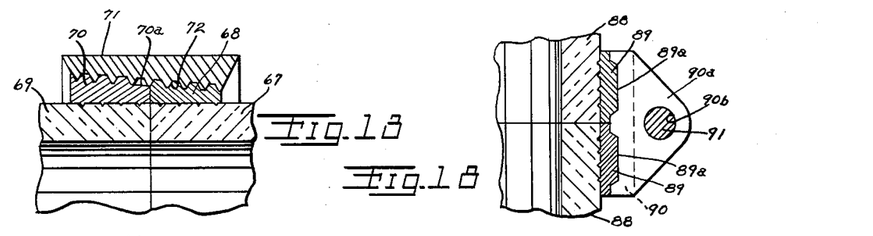
Fig. 13 is a fragmental transverse sectional view similar to Fig. 7 taken diametrically of a pipe.
Fig. 18 is a fragmental transverse sectional view, enlarged, taken along the line A—A of Fig. 17 showing another modification of my invention.

Another modification of my invention is shown in Fig. 13 which in some respects is similar to Fig. 7. Fig. 13, however, shows a continuous thread union, that is the threads on contiguous abutting ends of pipe are formed along one continuous taper rather than along two tapers as shown in Fig. 7. In Fig. 13 the pipe 67 of clay or other high tolerance dimension material is provided with a thread 68 formed along a taper which converges inwardly away from the end of the pipe 67. The pipe 69 is provided with a thread 70 which diverges outwardly away from the end of the pipe 69, the taper of threads 68 and 70 being so coordinated that they lie along one continuous frusto-conical surface when the pipes 67 and 69 are in abutment. The threads 68 and 70 are cast on the pipes 67 and 69 respectively by first roughening the surfaces of pipes 67 and 69 and then casting one of the materials described hereinafter. These are what I have called low tolerance dimension joint forming materials. Preferably, but not absolutely necessarily, a portion of one thread, preferably 180 degrees around the pipe, is blanked off as indicated at 70a near the pipe end of thread 70. If threads 68 and 70 were full threads clear to the abutting ends of the respective pipes 67 and 69, the two threads 68 and 70 would have to line up exactly, giving the appearance of one continuous thread, in order for the sleeve 71 to be threaded into position to hold the union together. This would require index marks on the pipe and very careful work in assembly. To avoid this I have blanked out a portion of the lead thread 70a on the thread 70 and I start the thread 70 with a full thread at approximately 180 degrees from the starting point at the end of thread 70 nearest the abutting end of pipe 69 against pipe 67. Thus, when the collar or sleeve 71 is threaded onto thread 70, it encounters a full and complete thread without any lead. This eliminated turning of the abutting pipes in order to match the threads. In actual test I have turned the normal point of matching threads as to 68 and 70 through 180 degrees of rotation and encountered no trouble in threading the sleeve 71 into place. The sleeve or collar 71 is made of any suitable rigid material and is provided with a thread 72 which matches the threads 68 and 70. In putting this joint together, the sleeve or collar 71 is first engaged with the thread 68 after which the pipe 69 is abutted against the pipe 67 and the sleeve or collar 71 is then turned on to the thread portion 70. If the threaded portions 68 and 70 are made of plastisol using a material of some resiliency, then the threads 68 and 70 may be compressed somewhat into the threads 72 of collar 71 so as to give a tight seal.

Figures 14, 19:
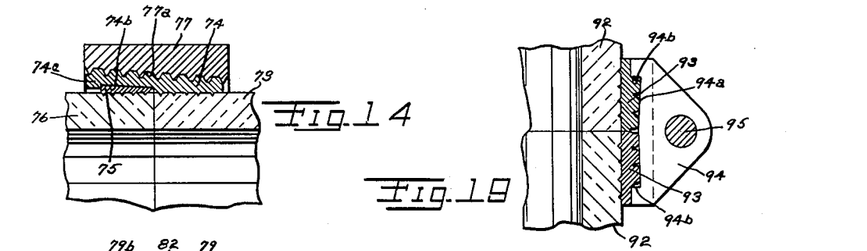
Fig. 14 is a fragmental transverse sectional view taken diametrically of a pipe showing another modification of my invention.
Fig. 19 is a fragmental transverse sectional view enlarged taken along the line A—A of Fig. 17 showing another modification of my invention.
Figures 15, 16, 17, 20, 21:
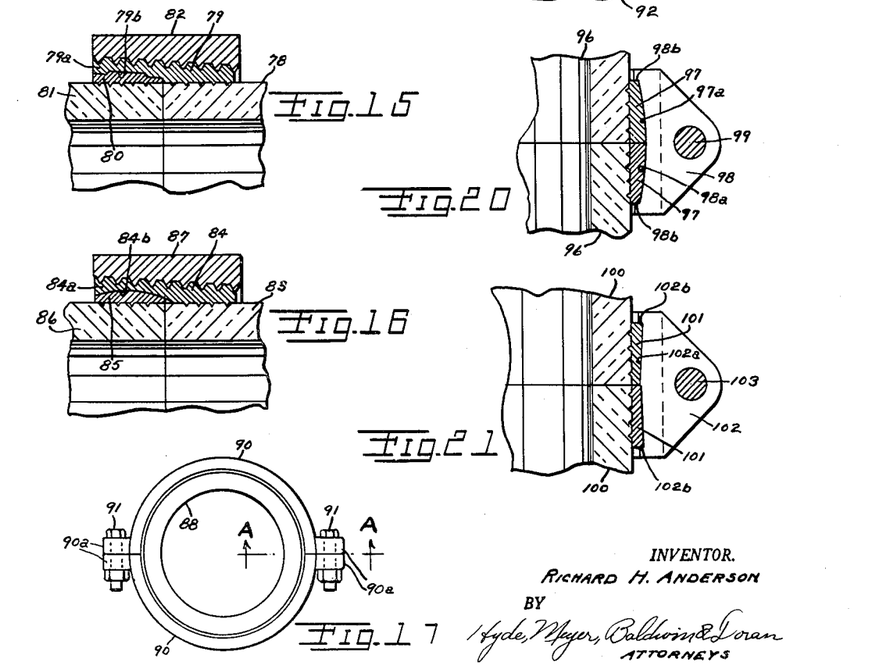

Three further modifications of my inventions having considerable similarity are shown in Figs. 14, 15 and 16 respectively. These three modifications all form what I have called a "taper seal union." In each case, on one pipe, say 73, a taper threaded portion 74 is cast by suitable molds, this taper threaded portion having a lip 74a extending beyond the end of pipe 73. A recess 74b is formed on the radially innermost surface of the lip 74a which fits snugly over a collar 75 which in turn is cast on the end of the abutting pipe 76. A collar 77 of rigid material is provided with a female thread 77a which corresponds to the threads on the portion 74. The collar 77 is first started on the portion of thread 74 of smaller diameter, after which the pipe 76 is abutted against pipe 73, the lip portion 74a having sufficient resiliency to snap over the collar 75 so that the same will fit into the recess 74. The tapered collar 77 is then threaded up on the lip portion 74a to the position in full lines in Fig. 14, and pulled up tight by means of a strap wrench. Because the system is tapered, it compresses the mating surfaces together tighter as the collar is pulled up to the full line position of Fig. 14. This makes the system leak-proof at the joint. The portion 74, 74a may be made of the materials described hereinafter under Example I utilizing suitable molds. Preferably, the plastisol will be somewhat resilient so that the lip 74a will have the ability to snap over the collar 75. This collar 75 may be cast onto the pipe 76 using the material of Example I, because while resilience is not so important in the collar 75, some resilience will aid in making a tighter seal when the joint is pulled up tight as described above. The collar 77 will be of any sufficiently rigid material and may be made of a phenolic condensate resin such as that known by the trade name of Bakelite.

In the modification of Fig. 15, on the pipe 78 there is cast a taper threaded portion 79 having an extending lip 79a similar to 74a and having a recess 79b on its radially innermost portion similar to 74b. A collar 80 complementary to the internal recess of the lip 79a is cast on the pipe 81. A collar 82 similar to 77 is provided with an internal female thread and is utilized to pull the joint together in a manner quite similar to that described in connection with Fig. 14. The lip portion 79a snaps over the collar 80 and the collar or sleeve 82 pulls the parts tightly together and seals the joints tight. The parts 79, 79a, 80 and 82 may be made of any of the low tolerance dimension materials mentioned in connection with Fig. 14.

In Fig. 16 still another modification is shown wherein pipe 83 has cast upon it the threaded portion 84 having the lip portion 84a and having a curved recess 84b formed on the radially innermost part of the portions 84 and 84a, as shown, by the use of suitable molds. A collar 85 having an external surface conforming to the recess 84b is cast upon the pipe 86. A collar or sleeve 87 has an internal female thread corresponding to the threads on the portuions 84 and 84a. This joint is assembled similar to the joints described in Figs. 14 and 15 and the parts thereof performing similar functions are constructed of materials similar to those described in connection with Figs. 14 and 15.

In Figs. 17, 18, 19, 20 and 21, I have shown four other modifications of my invention which I term "split flange union" types of pipe joint. The end elevational appearance of each of these forms is substantially the same and is indicated in Fig. 17. The fragmental sectional views shown in Figs. 18 to 21 inclusive, are taken at approximately the position indicated at the section line A—A, Fig. 17. In these forms of my invention, I provide a split flange having an internal surface of channel shape opening radially inwardly which will positively grip the portions of low tolerance dimension joint forming material cast on the ends of the abutting pipes of clay or similar high tolerance dimension material. In Fig. 18, on the ends of the pipes 88 there are cast identical collars 89 having annular rib-like portions 89a of annular form extending radially outwardly for a portion of the collar. It will be understood that the portions 89a might extend radially inwardly from other portions of the collar, my intention being to give surfaces which may be gripped by the split flange so as to hold the pipes 88 against relative endwise movement away from each other. Two semicircular split flanges 90 are then assembled around the abutting pipes 88, each split flange having an ear 90a. Through these ears there are registering openings 90b through which securing bolts 91 are passed and fastened. The radially innermost surfaces of the split flanges 90 are provided with conformations which are complementary to the collar 89 with their deformations 89a. Thus, when the parts are pulled up to the position shown in Figs. 17 and 18, the fitting deformations of the split flanges 90 and the collars 89 hold the pipes 88 against endwise movement away from each other. The pipes 88 are of high dimensional tolerance material while the parts 89 are of low dimensional tolerance.

In Fig. 19, I have shown still another modification of my invention which is similar to Fig. 18. However, in Fig. 19 I have shown two lengths of pipe 92 each provided with a threaded portion 93 at the end thereof, these threaded portions being quite similar to those shown in Fig. 7 although the threads are somewhat coarser. This type of pipe connection may be put together with a sleeve or collar similar to 43 shown in Fig. 7. I may also utilize these standard threaded pipes however to provide a split flange union as shown in Fig. 19. In this case, the split flange 94 is held in clamped position about the threaded portions 93 by means of two bolts 95 in all respects analogous to the parts 90 and 91 described in connection with Figs. 17 and 18. The radial innermost surfaces of the split flanges 94 are provided with channel formations 94a opening inwardly and adapted to embrace the threaded portions 93 so that when the parts are pulled up to the positions shown in Figs. 17 and 19, the split flange 94 will hold the pipes 92 against endwise movement away from each other. It will be noted that the channel formation 94a engages firmly at the points 94b so as to prevent this endwise movement. However, I prefer to make the threaded portions 93 with enough plasticizer so that the plastisol of which the portions 93 are formed is considerably resilient. This permits the threads on the portions 93 to be compressed when the split flange 94 is drawn up tightly. I have tried to show in Fig. 19 some compression of the threads when the split flange is drawn up tight but actually I have made such threads with such resilience that the threads have been compressed substantially into a solid mass so that they fill the recess 94a and really required no special shoulder such as that at 94b. In this actual embodiment which I have constructed the plastisol was placed under approximately twenty percent compression. This means that when the split flange is pulled up tight all of the threads are compressed together and a substantially continuous plastisol surface is in contact with the split flange collar making the system leak-proof.

In the modification of Fig. 20 the lengths of pipe 96 have cast upon them collars 97 which have radially outermost surfaces 97a which are convex outwardly and curve longitudinally of the pipe 96. These portions 97 end in the plane coincident with the end of the pipe 96 so that the portions 97 abut each other and make a substantially continuous convex bead on the outer ends of the abutting pipes 96. A split flange 98 similar to the flange 90 originally defined in connection with Figs. 17 and 18 is then placed about the abutting ends of the pipe and drawn up tightly by means of bolts 99. The radially innermost face of the split flanges 98 are provided with curved recesses 98a which conform to the exterior surfaces 97a of the abutting portions 97. Shoulders 98b on the split flanges 98 grip firmly behind those portions of the collars 97 farthest removed from the ends of the pipe 96 so that when the split flanges are pulled up tight to the position shown in Fig. 20, the collars 97 are gripped firmly by the split flange and the pipes 96 are held against relative endwise movement away from each other.

A still further embodiment is shown in Fig. 21 wherein the pipes 100 have collars 101 cast on their abutting ends. These collars are shown as frusto-conical in form and diverging away from the abutting ends of the pipes 100. The taper on the collars 101 might be reversed always assuming that the split flange is provided with a shoulder to grip upon the collars 101 and hold them together. The split flange 102 is provided with a recess 102a on its radially innermost surface which conforms to the abutting collars 101 as shown in Fig. 21. Shoulders 102b enter snugly behind those portions of collars 101 removed from the abutting ends of pipes 100 so that when the split flange is pulled up tight to the position shown in Fig. 21 by means of bolts 103, then the collars 101 are held firmly and pipes 100 cannot move relative to each other so as to part at the joint.

In Figs. 20 and 21 the collars 97 and 101 respectively may be cast onto the pipes 96 and 100 respectively using the formula of Example I, hereinafter described. However, if Example I is used and the formula is made somewhat resilient then the material of the collars 97 and 101 may be compressed firmly into the split flange surrounding them so as to provide a tight seal at this point.

To be satisfactory for my purpose in forming joints on pipe of the type herein described, and especially for general purpose pipe much of which is buried in the ground for long periods of time and subjected to various actions of chemicals and bacteria, only a very special substance will satisfy all purposes together with the requirements for economic production and efficient manufacture. Among the various points to be considered are the following: Price is important as the raw material must be cheap enough so that the normally cheap pipe is not greatly increased in cost by the provision of my improved joint thereon; availability of the joint forming material, so that there will be no lack of material; the flexibility of the joint so that in some cases exact alignment of the pipe is not required and in other cases the flexibility of the material itself aids in the sealing action of the joint; the chemical resistance of the joint forming material to the action of acids and alkalies in large variation; resistance of the joint forming material to bacterial action; the joint forming material must be adapted for slush molding by gravity so that practically no pressure is exerted in the case of the formation of the joint on clay pipe; good mold definition so that the various types of pipe joints herein referred to may be molded exactly and particularly that threads, where called for, will be sharp and exactly formed; the material must be easy to handle: that is, not too sensitive to slight changes in temperature or other surrounding conditions; the joint forming material should require only heat to set it; the joint material must be tough to withstand impact and shock resistant; the material should be non-toxic to persons handling it and with no objectionable fumes; joint-forming material should be capable of handling with simple equipment; joint forming material should have good weathering characteristics and not be greatly affected by sunlight; and finally the joint forming material should have very slight shrinkage upon setting so that the joints may be exactly formed.

After long research and hundreds of test I have found only one material which satisfactorily meets all of the above requirements and which can be set by the use of heat only (between 250 and 425 degrees Fahrenheit) and with good shrinkage namely .2 to .3%. This is the plastisol material described hereinbelow as polyvinyl chloride plastisol.

As mentioned previously, various low dimensional-tolerance materials may be utilized for forming the above mentioned joints but I have preferred materials as described hereinafter, namely, polyvinyl chloride plastisols as given in Example I sub-divisions a, b, c, d and e.

*Polyvinyl chloride plastisol—Example I*

I find that satisfactory joint forming materials for my purpose are what are generally known as plastisols. A plastisol is a mixture of resins and plasticizers which can be converted to continuous films by the application of heat. To the basic material, polyvinyl chloride powder, having the formula $(CH_2—CHCl)_n$, are added materials, called plasticizers, which render the finished material flexible and resilient. Representative plasticizers useful for my purpose are blended alcohol (average 8 carbon) phthalate, di-2-ethylhexyl phthalate, aromatic hydrocarbon condensate, by which I mean a mixture of alkylated polycyclic aromatic hydrocarbons in which 3- and 4-ring compounds predominate, methyl abietate, adipic acid derivatives of which there are a large number which are suitable but of which I prefer dioctyl adipate or di-(2-ethylhexyl) adipate, and epoxy-type plasticizers, of which the chemical composition is at present somewhat uncertain but representatives of which are commercially sold as KP–90 of Ohio-Apex, Inc., PX–800 of Pittsburgh Coke & Chemical Co., "RC"E-S of Rubber Corp. of America and "Admex" of Archer-Daniels-Midland Co. These plasticizers make the powdered polyvinyl chloride partially go into solution and give the material a semi-liquid form with a viscosity of from 4000 to 30,000 centipoises. To this mixture I prefer to add fillers to cheapen the mix for economic use, such fillers being finely ground silica (to pass 150 mesh), barium sulphate, coke, calcium carbonate, starch, or clay having thixotropic quality.

To make the above mixture heat stable, materials such as dibasic leadphosphite, hydrous tri-basic lead sulphate, tetra ethyl lead, and numerous other lead bearing compounds are used.

The above mentioned plastisol in liquid form can then be poured into open top molds without the use of pressure, and it is fluid enough to fill up the die impression exactly. On the application of heat in the range of 250 to 425 degrees Fahrenheit, the mass fuses and become a solid mass which on cooling is a tough flexible material with elastic properties.

Some typical compositions useful in forming my polyvinyl chloride plastisols are as follows:

A

| | Parts by weight |
|---|---|
| Polyvinyl chloride powder | 100 |
| Barytes (BaSo)—100 mesh | 55 |
| Aromatic hydrocargon condensate | 29 |
| Blended alcohol phthalate | 30 |
| Tribasic lead sulphate | 3 |

B

| | Parts by weight |
|---|---|
| Polyvinyl chloride powder | 100 |
| Silica Sand—150 mesh | 55 |
| Aromatic hydrocargon condensate | 34 |
| Di-2-ethylhexyl phthalate | 35 |
| Tetra ethyl lead | 5 |

C

| | Parts by weight |
|---|---|
| Polyvinyl chloride powder | 100 |
| Silica sand | 100 |
| Di-2-ethylhexyl phthalate | 70 |
| Tetra ethyl lead | 3 |

D

| | Parts by weight |
|---|---|
| Polyvinyl chloride powder | 100 |
| Iron oxide | 7 |
| Antimony oxide | 3 |
| Di-N-octyl phthalate | 93 |
| Epoxy-type plasticizer | 60 |
| Tetra ethyl lead | 7 |
| Silica sand—150 mesh | 63 |

E

| | Parts by weight |
|---|---|
| Polyvinyl chloride powder | 100 |
| Iron oxide | 7 |
| Antimony oxide | 3 |
| Di-N-octyl phthalate | 93 |
| Dioctyl adipate | 60 |

The great advantage of the above mentioned polyvinyl chloride plastisols for use with my invention resides in their ability to be slush molded with no pressure directly upon the clay surface. Ordinary clay pipe usually should not be subjected to a pressure extered outwardly on the bell or socket above 100 pounds per square inch, i.e. when the clay is in tension. Likewise, ordinary clay pipe should usually not be subjected to over 500 pounds pressure on the outside of the pipe, exerted inwardly, i.e. when the clay is in compresion. Rubber cannot be used for forming my improved joints on clay pipe because the molding of rubber to exact dimension, in situ, calls for thousands of pounds of pressure per square inch which would rupture the clay pipe.

In my search for the above satisfactory joint forming material, I made and tested joints from dozens of different synthetic resins and from hundreds of compositions wherein the resins were varied utilizing different fillers, extenders, plasticizers, and catalysts. None of these other materials had the qualities which I have above enumerated as necessary for a successful pipe joint of the type herein described.

A typical operation of forming a pipe joint according to my improved method. The portion of the pipe on which the joint is to be formed is first coated with a primer so as to make the polyvinyl chloride plastisol stick to the pipe. For this purpose, I use a thermo-setting type of adhesive because the bond must be sufficiently developed between the pipe and the plastisol joint while the joint is still warm so as to enable the mold to be stripped without tearing the plastisol material free from the pipe. The best primer materials known to me for this purpose are Miracle Adhesive B–285–C, Bostik 4585 made by B & B Chemical Company and Marbon made by the Marbon Corporation. The pipe, with the primer coat applied, is then set on a suitable flat surface and surrounded by the mold form leaving an annular space between the pipe and the mold to receive the joint forming material. The joint forming material compounded according to the above recited Example I and of slushy composition is then poured into the mold to the proper height to form the joint defined by the mold. Heat is then applied to the material while it is in the mold in the range of 250 to 425 degrees Fahrenheit until the mass fuses and becomes a solid mass within the mold. After the mass has set, the mold is stripped from the joint.

One of the advantages of all of these joints which I have described, is that the use of my invention permits the successful operation of the various joints due to holding a close tolerance with the material which I mold on the end of a cheap pipe. Any of these pipes, when assembled according to my teachings, give considerable rigidity and mechanical strength to the joint, although some of those shown will give greater rigidity and others will give a certain amount of deviation from a straight line, where desired. Pipes constructed according to my invention will last a long time with great resistance to bacteria or to weathering and will successfully withstand infiltration and internal hydrostatic pressures as previously described. The materials used for forming the various joints which I have described do not detract from the long life of the type of pipe which is commonly used in the less expensive types of piping which as I have previously mentioned includes clay, cement and cast iron pipe, drain tile, stoneware and chemical porcelainware.

In the specification and claims I have referred to high dimensional-tolerance materials as forming the main body of the pipe. As examples of such materials, I may recite four inch clay pipe which commonly varies one-eighth inch plus or minus from a normal standard dimension or a total of one-quarter inch. Another such material is cast iron which when sand molded with no controlled analysis will commonly vary in the four-inch size as much as one-sixteenth inch in diameter. I have also referred herein to low dimensional-tolerance materials for forming the pipe joint and the polyvinyl chloride plastisols herein described under Example I vary approximately .005 inch in casting a joint on a four-inch diameter pipe. Therefore, where I hereinafter refer in the claims to "high dimensional-tolerance material" or similar phase, I mean a material which commonly varies as much as one-sixteenth inch in four inches or more. Wherever in the claims I refer to "low dimensional-tolerance material" or like phrase I mean one wherein the tolerance is a few thousandths of an inch in a four inch diameter.

To recapitulate, the following parts shown in the drawings may be formed from the polyvinyl chloride plastisols of Example I: the part 40 of Fig. 3, the parts 40a of Fig. 7 and the similar cast collar of Fig. 7a, the parts 40b of Fig. 8, the parts 50 and 53 of Fig. 9, the part 57 of Fig. 10, the part 57' of Fig. 11, the part 64 of Fig. 12, the parts 68 and 70 of Fig. 13, the parts 74 and 74a of Fig. 14, also the collar of 75 of Fig. 14 if desired, the parts 79 and 80 of Fig. 15, the parts 84 and 85 of Fig. 16, the parts 89 of Fig. 18, the parts 93 of Fig. 19, the parts 97 of Fig. 20, and the parts 101 of Fig. 21.

Another type of joint which may be formed of the polyvinyl chloride plastisols of Example I is that shown and claimed in my copending application Serial No. 324,898, filed December 9, 1952 and entitled "Push Type Pipe Joint."

This application is a continuation-in-part of my copending application Serial No. 376,195, filed August 24, 1953 and which in turn was a continuation-in-part of application Serial No. 279,731, filed April 1, 1952, now abandoned.

What is claimed is:

1. The combination of a pipe and a joint forming annular ring of a gravity-moldable synthetic resin cured and substantially bonded thereto, said synthetic resin being chosen from the group consisting of polyvinyl chloride plastisol having some resiliency when cured and said polyvinyl chloride plastisol plus a filler, wherein said polyvinyl chloride plastisol resin consists essentially of a cured mixture of polyvinyl chloride plus a plasticizer chosen from the group, blended alcohol (average 8 carbon) phthalate, di-2-ethylhexyl phthalate, methyl abietate, and a mixture of alkylated polycyclic aromatic hydrocarbons (predominantly 3- and 4-ring compounds), and wherein said pipe is of clay and the like and generally cylindrical but slightly out-of-round, and having two of said annular rings substantially bonded thereto, one at each end of said pipe and truly annular, said rings providing male and female joint parts respectively at opposite ends of said pipe and of a configuration to form a complete tight-fitting pipe joint when said male part of said pipe is joined with said female part of an identical pipe.

2. The combination of a pipe of clay and the like which is generally cylindrical but slightly out-of-round, having two joint forming annular rings of a gravity-moldable synthetic resin cured and substantially bonded thereto, one at each end of said pipe and truly annular, said rings forming male and female joint parts respectively at opposite ends of said pipe and of a configuration to form a complete tight-fitting pipe joint when said male part of said pipe is joined with said female part of an identical pipe, said synthetic resin being chosen from the group consisting of polyvinyl chloride plastisol having some resiliency when cured and said polyvinyl chloride plastisol plus a filler.

3. The combination of claim 2 wherein said polyvinyl chloride plastisol resin consists essentially of a cured mixture of polyvinyl chloride plus a plasticizer chosen from the group, blended alcohol (average 8 carbon) phthalate, di-2-ethylhexyl phthalate, methyl abietate, dioctyl adipate, di-(2-ethylhexyl) adipate, epoxy-type plasticizers, and a mixture of alkylated polycyclic aromatic hydrocarbons (predominantly 3- and 4-ring compounds).

References Cited in the file of this patent

UNITED STATES PATENTS

| | | |
|---|---|---|
| 2,284,741 | Johnston | June 2, 1942 |
| 2,327,128 | Renfrew | Aug. 17, 1943 |
| 2,401,554 | Davids | June 4, 1946 |
| 2,739,829 | Pedlow | Mar. 27, 1956 |

FOREIGN PATENTS

| | | |
|---|---|---|
| 47,628 | Netherlands | Jan. 15, 1940 |
| 591,611 | Great Britain | Aug. 22, 1947 |
| 606,936 | Great Britain | Aug. 23, 1948 |

OTHER REFERENCES

P.V.C. Paste, its properties and uses by D. K. Baird, British Plastics, April 1948, pages 167–171.